United States Patent
Hashizume

(10) Patent No.: US 9,964,842 B2
(45) Date of Patent: May 8, 2018

(54) LIGHT SOURCE APPARATUS AND PROJECTOR

(71) Applicant: SEIKO EPSON CORPORATION, Tokyo (JP)

(72) Inventor: Toshiaki Hashizume, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 14/857,351

(22) Filed: Sep. 17, 2015

(65) Prior Publication Data

US 2016/0091782 A1    Mar. 31, 2016

(30) Foreign Application Priority Data

Sep. 30, 2014   (JP) ................................. 2014-200037

(51) Int. Cl.
G03B 21/20    (2006.01)

(52) U.S. Cl.
CPC ......... *G03B 21/204* (2013.01); *G03B 21/208* (2013.01)

(58) Field of Classification Search
CPC .......... F21V 13/02; F21V 14/08; F21V 13/04; F21V 5/04; F21V 7/22; F21V 8/00; F21V 9/10; F21V 69/16; G03B 21/20; G03B 21/00
See application file for complete search history.

(56) References Cited

U.S. PATENT DOCUMENTS

| 2012/0051044 | A1  | 3/2012  | Akiyama |
|---|---|---|---|
| 2012/0249972 | A1* | 10/2012 | Kurosaki ........... G03B 21/2013 353/31 |
| 2013/0070207 | A1* | 3/2013  | Korenaga ............ G02B 17/004 353/31 |
| 2013/0107226 | A1  | 5/2013  | Aksenov |
| 2013/0163224 | A1* | 6/2013  | Chang .................. H04N 9/3114 362/84 |
| 2014/0218623 | A1* | 8/2014  | Kimura ................ H04N 9/3111 348/744 |
| 2014/0240676 | A1* | 8/2014  | Maes .................... G03B 21/204 353/20 |
| 2015/0036107 | A1* | 2/2015  | Nagahara ............. G03B 21/208 353/31 |

(Continued)

FOREIGN PATENT DOCUMENTS

| JP | 2011-191466 A | 9/2011 |
|---|---|---|
| JP | 2012-047996 A | 3/2012 |
| JP | 2012-215633 A | 11/2012 |

(Continued)

*Primary Examiner* — Sultan Chowdhury
*Assistant Examiner* — Danell L Owens
(74) *Attorney, Agent, or Firm* — Oliff PLC

(57) ABSTRACT

A light source apparatus includes a light source that outputs excitation light, and a rotating light emitting device in which a wavelength conversion element that emits light when irradiated with the excitation light is provided on a rotating disk. A spot of the excitation light on the wavelength conversion element has a shape that is long in a radial direction of the rotating disk and short in a circumferential direction of the rotating disk. Alternatively, an orthogonally projected length of the spot in the radial direction is greater than an orthogonally projected length of the spot in the circumferential direction.

12 Claims, 6 Drawing Sheets

(56) References Cited

U.S. PATENT DOCUMENTS

2016/0006221 A1  1/2016  Nguyen
2016/0065919 A1* 3/2016  Miyata ................ G02B 26/008
                                                                353/31

FOREIGN PATENT DOCUMENTS

| JP | 2013-537642 A | 10/2013 |
| JP | 2013-229145 A | 11/2013 |
| JP | 2015-108758 A | 6/2015 |
| WO | 2014-196015 A1 | 12/2014 |

* cited by examiner

continued content omitted …

LIGHT SOURCE APPARATUS AND PROJECTOR

BACKGROUND

1. Technical Field

The present invention relates to a light source apparatus and a projector.

2. Related Art

Using a solid-state light source as a light source of a liquid crystal projector on a commercial basis is underway (see JP-A-2012-47996). Blue light from a laser or any other solid-state light source is caused to impinge on a phosphor adhering to a rotating disk so as to cause the phosphor to emit yellow light. The yellow light can be combined with blue light from another laser to form white light. Light valves formed of three liquid crystal panels produce video images of three colors, which are combined with one another by a prism, and the combined video images are projected through a projection lens on a screen. A solid-state light source is characterized by a long period during which brightness is maintained, significantly low probability of blowout, and environmental friendliness owing to no mercury content as compared with a mercury lamp of related art and hence considered as a technology that further advances in the future. YAG containing Ce ions is frequently used as the phosphor and has excellent reliability because it is hardly degraded at a high temperature of 200° C.

The phosphor converts the wavelength of excitation light to produce light having a wavelength longer than the wavelength of the excitation light. Quantum dots also have the wavelength conversion function (see JP-A-2013-229145).

A YAG phosphor containing Ce ions is diffused into a binder made, for example, of a silicone resin or a glass material, and the mixture of the phosphor and the binder is fixed in the form of a thin film onto a rotating disk, or a YAG phosphor ceramic in the form of a thin film itself is fixed onto a rotating disk without using a binder. The thus fixed phosphor is irradiated with blue laser light, which excites the Ce ions and causes them to emit yellow light. The phosphor is thus used as a light source for a projector. In this process, at the time of the wavelength conversion, in which the blue light is converted into the yellow light, energy loss (Stokes loss) occurs, resulting in heat generation. Since the light source of a projector is required to be a point light source that emits intense light, a wide excitation light beam is applied onto a phosphor in the form of a small spot. An excitation section is therefore partially heated to a high temperature. To dissipate the heat into the air, the rotating disk is rotated at high speed. A silicone resin and a phosphor have low thermal conductivity ranging from about 0.2 to 12 W/mK and are also characterized in that the thermal conductivity thereof decreases as the temperature increases. The heat dissipation is therefore insufficient, and the silicone resin is degraded due to high temperatures, resulting in a decrease in the conversion efficiency of the YAG phosphor itself. Further, a part of the light source is broken depending on input energy. To understand the energy inputted to a phosphor light source, the phosphor light source is compared with a point light source formed of a 200-W ultrahigh-pressure mercury lamp having an arc length of 1 mm having been used in related art by way of example. An ultrahigh-pressure mercury lamp has a light emission efficiency of about 25%, and the amount of emitted light is therefore 50 W. To replace the ultrahigh-pressure mercury lamp with a YAG phosphor, an excitation section having a size of 1 mm needs to emit intense light of 50 W. Assuming that the phosphor has a conversion efficiency of 50%, heat equivalent to 50 W is generated. Heat equivalent to about 50 W is therefore generated in a spot of 1 mm square. When the rotating disk has a diameter of several centimeters, the silicone resin is heated to a temperature higher than 200° C., which degrades the silicon resin. It is, of course, conceivable to increase the number of revolutions of the rotating disk and the radius thereof, but countermeasures against the heat are still required in consideration of the facts that the amount of heat transfer from the rotating disk to the air is small and rotation power of a motor is limited.

SUMMARY

An advantage of some aspects of the invention is to raise the limitations.

When the YAG phosphor is irradiated with the laser blue light, the light emission occurs in the Ce ions contained in the YAG. The Ce ions are foreign matter among the intrinsic YAG atoms, and the content of the Ce ions is controlled to be a trace amount. At the time of light emission, local heat generation occurs around each of the Ce ions in the YAG phosphor, and the heat propagates through the surroundings. When the phosphor has a thickness of about 100 μm, the heat propagation period is on the order of milliseconds. In this process, the efficiency of light emission resulting from the excitation decreases. The time constant of the light emission resulting from the excitation is reportedly on the order of nanoseconds, but the fact that light emission exponentially attenuates means that a longer period is required until the ground state is reached. In this period, from the excitation of the YAG to the light emission, the energy conversion efficiency decreases.

The YAG phosphor containing Ce ions has been described above, and quantum dots have the same problem. Further, the heatproof temperature of quantum dots is about 100° C., which means that it is impossible, from the viewpoint of reliability, to irradiate quantum dots with high-energy excitation light in a small spot.

A light source apparatus according to an aspect of the invention includes a light source that outputs excitation light and a rotating light emitting device in which a wavelength conversion element that emits light when irradiated with the excitation light is provided on a rotating disk, and a spot of the excitation light on the wavelength conversion element has a shape that is long in a radial direction of the rotating disk and short in a circumferential direction of the rotating disk, or an orthogonally projected length of the spot in the radial direction is greater than an orthogonally projected length of the spot in the circumferential direction.

The spot may have an oblong shape, an elliptical shape, or a shape that approximates an oblong shape or an elliptical shape.

The wavelength conversion element may contain a phosphor.

The wavelength conversion element may contain phosphor quantum dots.

The shape of the spot may be formed by an effect of a pair of lens arrays or a rod.

The shape of the spot may be formed by a diffraction grating, an elliptical lens, or an elliptical Fresnel lens.

The light source apparatus may further include an optical integration system which includes a pair of lens arrays and on which light having exited out of the spot is incident. An image of the spot may be formed on a lens cell of a downstream lens array of the pair of lens arrays, and a longitudinal direction of the image of the spot may coincide with a longitudinal direction of the lens cell, coincide with a diagonal direction of the lens cell, or coincide with an intermediate direction between the longitudinal direction and the diagonal direction.

The light source apparatus may further include an optical integration system which includes a rod and on which light having exited out of the spot is incident. An image of the spot may be formed on a light incident end surface of the rod, and a longitudinal direction of the image of the spot may coincide with a longitudinal direction of the light incident end surface, coincide with a diagonal direction of the light incident end surface, or coincide with an intermediate direction between the longitudinal direction and the diagonal direction.

A projector according to another aspect of the invention includes the light source apparatus described above and a light modulator.

In the projector, the spot may have a shape similar to a shape of a light modulation region of the light modulator.

Setting the shape of the spot of the excitation light with which the wavelength conversion element is irradiated to be long in the radial direction of the rotating disk but short in the circumferential direction thereof increases the area of a region irradiated with the excitation light per rotation of the rotating disk. Further, the irradiation period spent at a single point is shortened. As a result, the optical density of the excitation light on the wavelength conversion element decreases as compared with the optical density in related art, whereby an increase in the temperature of an excitation section can be suppressed. For example, the increase in the temperature in a case where the width of the excitation section is 2 mm is about 60% of the increase in the temperature in a case where the width of the excitation section is 1 mm, whereby the conversion efficiency of the wavelength conversion element and the reliability thereof increase. On the other hand, the wavelength conversion efficiency in a case where after the wavelength conversion element is excited but before it returns to the ground state, the wavelength conversion element is excited again is lower than the wavelength conversion efficiency in a case where the wavelength conversion element is excited from the ground state, but the proportion of the excitation in the low wavelength conversion efficiency state can be lowered, whereby a high wavelength conversion efficiency state, that is, bright light emission is achieved.

Further, in an illumination system including an optical integrator and a polarization conversion element, the longitudinal direction of an image of an excitation light source formed by a first lens array on a second lens array is set to coincide with the longitudinal direction or a diagonal direction of a lens cell in the second lens array or the polarization conversion element, whereby the projector can form bright images. Alternatively, in a case where a rod is used as an optical integration illumination system, setting the longitudinal direction of a spot image to coincide with any direction between the longitudinal direction and a diagonal direction of the rod causes no light truncation in the optical integration illumination system of an illumination system of a projector, whereby the projector can form bright images.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
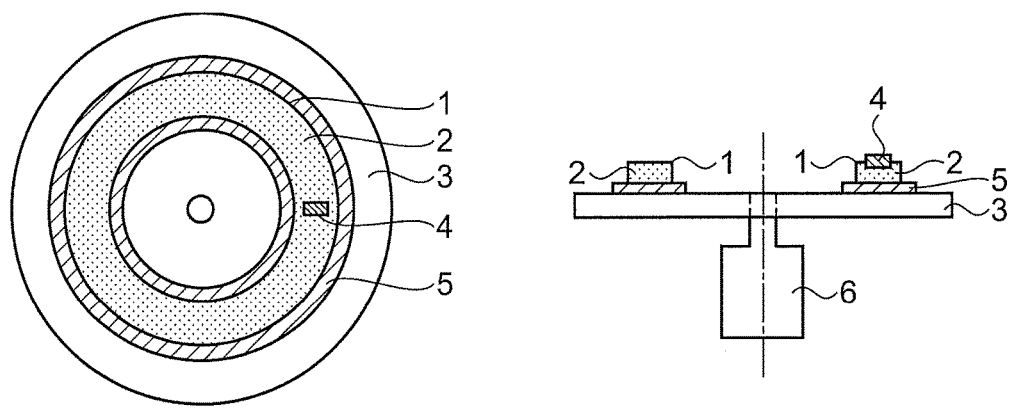
FIG. 1 is a plan view and a cross-sectional view of a rotating light emitting device in a first embodiment.

FIG. 1 is a plan view and a cross-sectional view of a rotating light emitting device in a light source apparatus according to a first embodiment. The rotating light emitting device includes a wavelength conversion element 1, a rotating disk 3, and a reflection film 5. The wavelength conversion element 1 is made of a silicone resin in which a plurality of particles that form a YAG phosphor 2 are dispersed. The wavelength conversion element 1 is irradiated with excitation light. In the specification, a spot of the excitation light on the wavelength conversion element 1 is called an excitation section.

The wavelength conversion element 1 is provided on the upper surface of the rotating disk 3, which is made of aluminum and has a diameter of about 50 mm, and has a donut-like shape having a thickness of 0.2 mm and a width of 5 mm. The rotating disk 3 is thick enough to transfer heat in the wavelength conversion element 1 to the interior of the rotating disk 3 and dissipate the heat into the air with the aid of rotation of the rotating disk 3. The thickness of the rotating disk 3 is, for example, preferably 0.5 mm or greater. The rotating disk 3 is fixed to the shaft of a motor 6 so that the rotating disk 3 rotates at least at 100 revolutions per second for heat dissipation into the air. The content of the YAG phosphor 2 in the silicone resin is about 50% in volumetric concentration. The YAG phosphor 2 contains a trace amount of Ce ions in the YAG crystal. The Ce ions emit yellow light when they absorb blue laser light, are therefore excited from the ground state and activated, and return to the ground state again.

The excitation section 4 is a portion irradiated with blue laser light. The excitation section 4 has an oblong shape elongated in the radial direction. It is assumed that the blue laser light used for excitation has a wavelength of 450 nm and temporarily has an energy quantity of 100 W. The wavelength of the emitted yellow light ranges from about 500 to 700 nm. In the process from the excitation to the light emission, the amount of energy loss is estimated as follows: Assuming that the center wavelength of the yellow light is 600 nm, the amount of energy loss produced when a single photon of the blue light is converted from 450 nm to 600 nm is 1−450/600=0.25, which means that 25% of the energy of the photon is converted into heat. This energy loss is called Stokes loss. In the case of 100-W blue excitation light, 25 W is converted into heat due to Stokes loss. In addition to Stokes loss, when the phosphor has a defect or is otherwise defective, the blue laser light is absorbed by the defect and converted into heat. When the temperature of the YAG phosphor 2 increases, the wavelength conversion efficiency of the YAG phosphor 2 decreases, and heat is generated accordingly. As a result, about 50 W is converted into heat in the YAG phosphor 2. The heat propagates to the surrounding silicone resin. Since the thermal conductivity of a silicone resin, which is about 0.2 W/mK, is significantly lower than the thermal conductivity of the YAG phosphor 2, which is about 14 W/mK, the heat generated in the YAG phosphor 2 is held due primarily to thermal resistance of the silicone resin and conducted at the time constant of the silicone resin.

In the first embodiment, consider a case where an area of 1 square millimeter is irradiated with the excitation light and estimate the resultant temperature. It is assumed that the thickness of the wavelength conversion element 1 is 0.1 mm. In the first embodiment, the shape of the light spot on the excitation section 4 is set at 0.5 mm in the circumferential direction and 2 mm in the radial direction so that the light spot is short in the circumferential direction but long in the radial direction. Assuming that a portion scanned with the excitation light is a circle having a diameter of 50 mm, the area of the portion, which is irradiated with the excitation light, of the wavelength conversion element 1 is 314 square millimeters. The temperature increases to about 120° C. based on the thickness, the thermal conductivity, and the area described above. The resultant temperature falls within a range over which a silicon resin can be used, that is, the reliability of the silicone resin is maintained and the characteristics of the phosphor can also be maintained.

In contrast, when the excitation section is formed in a square of 1 mm square, the area of the region, which is irradiated with the excitation light, of the wavelength conversion element 1 is 157 square millimeters, and the resultant temperature is higher than 200° C. In this case, the reliability of the silicone resin decreases, and the light emission efficiency of the phosphor decreases. The decrease in the efficiency of the phosphor further increases the amount of heat generation, eventually resulting in breakage.

As described above, in the first embodiment, in which the shape of the excitation section 4 on the YAG phosphor 2 is set to be long in the radial direction but short in the circumferential direction, the overall area of the YAG phosphor 2 irradiated with the excitation light increases, and the heat generating portion of the wavelength conversion element 1 is therefore widened so that the heat is dispersed, whereby the increase in the temperature can be suppressed. As a result, the conversion efficiency of the YAG phosphor 2 increases, and the YAG phosphor 2 therefore emits bright light and has increased reliability. The problem of breakage of the phosphor is no longer present.

Further consider the light emission phenomenon. The time constant of the phenomenon in which the phosphor is excited, emits light, and stops emitting the light is about several hundred nanoseconds. Since the light attenuation proceeds exponentially, it takes a long time to completely reach the ground state. That is, before the Ce ions having absorbed the blue laser light and having therefore been excited return to the ground state next time, it is expected that the Ce ions are not excited or are excited at low light emission efficiency even when irradiated with the blue laser light. Assuming that a period required for the Ce ions present in the excitation section 4 to return to the ground state next time is 1 microsecond, a portion that newly enters, due to the rotation, the excitation section 4, which is irradiated with the blue laser light, in the period is a highly efficient excitation section. The area of this excitation section is greater in a case where the excitation section is longer in the radial direction than in a case where the excitation section is shorter in the radial direction. That is, in the first embodiment, since the excitation section 4 has an oblong shape that is twice longer in the radial direction than in the circumferential direction, the excitation section has a doubled effective area as compared with a case where the excitation section 4 has a square shape. As a result, a greater proportion of the YAG phosphor 2 is excited in a state in which the Ce ions are completely in the ground state and hence have high light emission efficiency, whereby the light conversion efficiency desirably increases.

Second Embodiment

Figure 2:
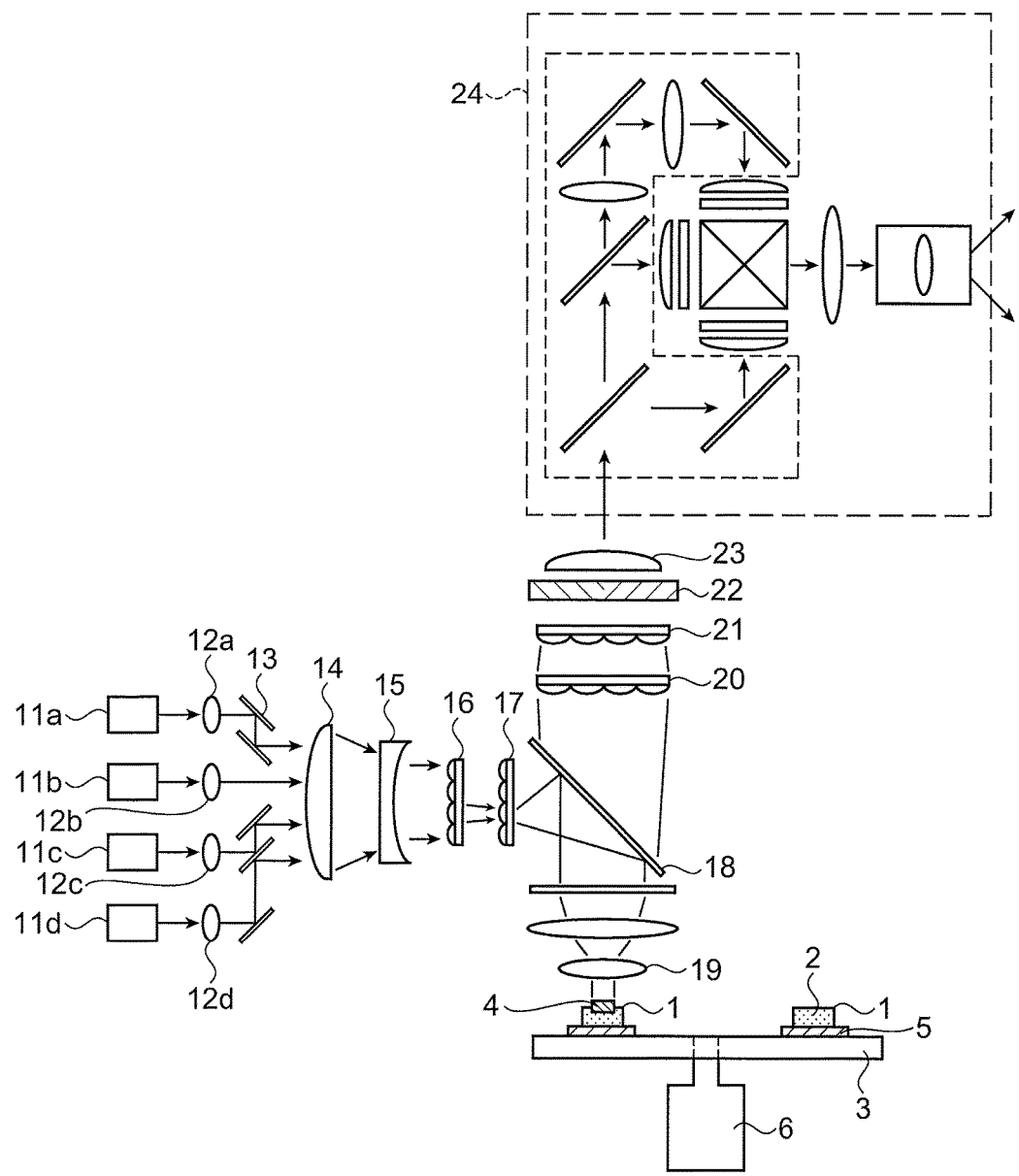
FIG. 2 shows an optical system for achieving the shape of an excitation section in a second embodiment.

FIG. 2 shows, as a second embodiment, an optical system for achieving the shape of the excitation section 4 in the first embodiment and shows an optical system of a projector.

The projector in the present embodiment includes the light source apparatus in the first embodiment.

Blue light emitted from each of lasers 11a, 11b, 11c, and 11d is parallelized by collimator lenses 12a, 12b, 12c, and 12d, deflected by folding mirrors 13 so that the optical paths are effectively shortened, and converted by a collector lens 14 and a parallelizing lens 15 into spatially dense, parallelized light.

A lens array 16 is an array formed of individual lenses each of which has a shape similar to the shape of the excitation section 4, and a lens array 17 has the same number of individual lenses as the number of lenses in the lens array 16. The lens arrays 16 and 17 form an optical integration system. That is, laser rays having passed through the individual lenses in the lens array 16 are collected at the corresponding individual lenses in the lens array 17. The lens array 17 superimposes images of the corresponding individual lenses in the lens array 16 on one another on the wavelength conversion element 1 via a pickup lens 19. The excitation section 4 having a shape similar to the shape of the lens array 16 can thus be formed on the wavelength conversion element 1, and uniform excitation light can be formed in the excitation section 4. A mirror 18 is provided to reflect the blue light, transmits the yellow light from the phosphor, and then guides the yellow light to an illumination optical system.

In the present embodiment, the optical integration system formed of the pair of lens arrays 16 and 17 is used to form the excitation section 4 elongated in the radial direction on the wavelength conversion element 1. Instead, the lens arrays 16 and 17 may be replaced with a rod. That is, the parallelizing lens 15 and the lens arrays 16 and 17 may be replaced with a rod having an oblong shape, and a field lens may be disposed at the exit of the rod to form the excitation section 4 having an oblong shape elongated in the radial direction on the wavelength conversion element 1. Still instead, the optical integration system can be replaced with a hologram, and the hologram can be used to form the excitation section 4 having the oblong shape. Still instead, an elliptical lens or an elliptical Fresnel lens that forms an elliptically collected spot or a diffraction grating may be used to form an elliptically collected light shape. Still instead, since the light having exited out of each of the collimator lenses 12a, 12b, 12c, and 12d has an elongated elliptical shape, the corresponding folding mirror 13 and the collector lens 14 may be used to guide the light to the rotating disk 3, where the excitation section 4 elongated in the radial direction may be formed. Still instead, the excitation section 4 may have a shape that approximates an oblong shape or an elliptical shape.

FIG. 2 further shows a lens array 20, a lens array 21, a polarization conversion element 22, a collector lens 23, and a projector engine 24 for illumination of liquid crystal panels as light modulators. The projector engine 24 is an optical engine for separating the light from the excitation section 4 into three color light fluxes, illuminating liquid crystal panels for color light fluxes with the three color light fluxes, combining the color light fluxes modulated by the liquid crystal panels with one another, and projecting the combined light through a projection lens.

Figure 3:
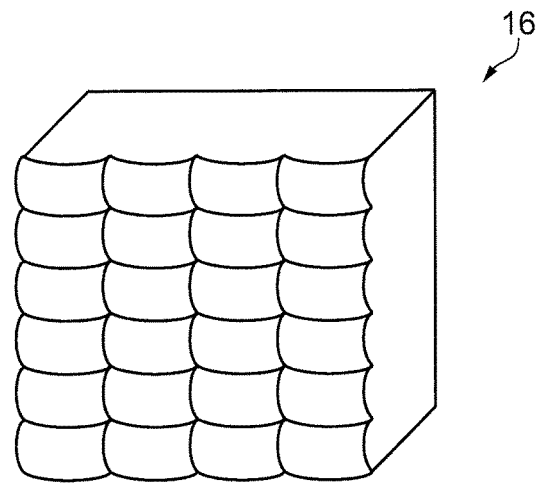
FIG. 3 is a perspective view of a lens array in the second embodiment.

FIG. 3 is a perspective view of the lens array 16 in the second embodiment. Since each of the constituent individual lenses is set to be longer in the horizontal direction than in the vertical direction, the excitation section 4 on the wavelength conversion element 1 is long in the radial direction of the rotating disk 3 but short in the circumferential direction thereof.

Figure 4:
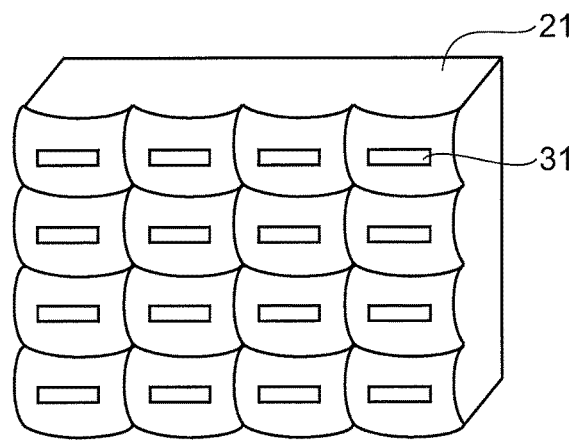
FIG. 4 is a perspective view of another lens array in the second embodiment.
Figure 5:
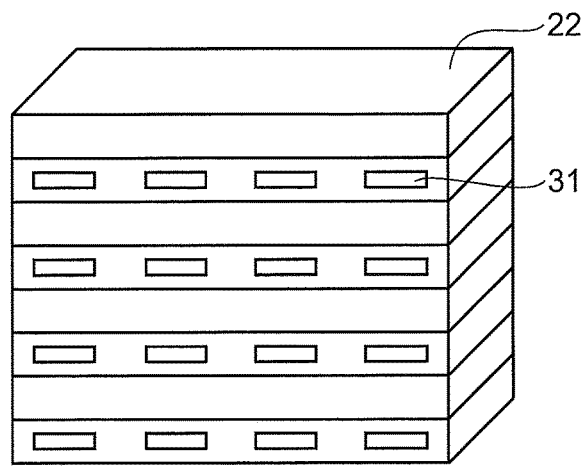
FIG. 5 is a perspective view of a polarization conversion element in the second embodiment.

FIG. 4 is a perspective view of the lens array 21 in the second embodiment. FIG. 5 is a perspective view of the polarization conversion element 22 in the second embodiment. An image 31 of the oblong excitation section 4 is formed by the lens array 20 on each of the lens array 21 and the polarization conversion element 22, as shown in FIGS. 4 and 5. The lens array 21 is so shaped that the images are formed within the individual lenses in the lens array 21. That is, since the excitation section 4 is elongated in the radial direction in the second embodiment, the lens array 21 of an optical integration illumination system is horizontally elongated so that the images 31 of the excitation section 4 fall within the lenses in the lens array 21. Further, in a projector using liquid crystal panels as light modulators, since only light polarized in one direction is used, the polarization conversion element 22, which separates light incident on polarization separation films into a vertically polarized component and a horizontally polarized component and then aligns the polarized components with each other in wave plates, is configured to have a horizontal arrangement so that the images 31 of the excitation section 4 fall within the polarization separation films. As a result, a projector that prevents light truncation and can therefore project a bright image is provided.

In addition to the configuration described above, the longitudinal direction of the light source images (images of excitation section 4) may be caused to coincide with a diagonal direction of the lenses in the downstream lens array of the pair of the lens arrays and the polarization conversion element 22 may be set in parallel to the light sources but inclined thereto. The longitudinal direction of the light source images may instead coincide with an intermediate direction between the longitudinal direction and a diagonal direction of the lens cells in the downstream lens array of the pair of the lens arrays.

In the second embodiment, the lens arrays 20 and 21 are used to illuminate the liquid crystal panels. In a DLP (registered trademark) projector including a DMD (digital micromirror device) as a light modulator, a rod is used in place of the lens arrays 20 and 21. In this case, the light incident end surface of the rod may have an oblong shape so that the excitation section 4 has a shape similar to the shape of the light incident end surface of the rod with the shorter side of the oblong shape extending in the circumferential direction. Instead, the longitudinal direction of the light source images may coincide with an intermediate direction between the longitudinal direction and a diagonal direction of the light incident end surface of the rod.

Figure 6:
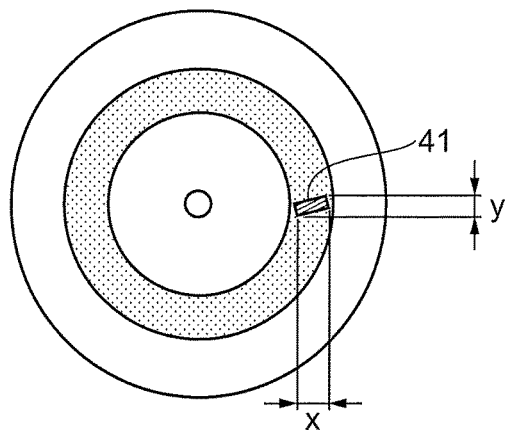
FIG. 6 is a plan view of another rotating light emitting device in the second embodiment.

In the first embodiment, the excitation section 4 is set to be elongated in the radial direction. Instead, an excitation section 41 inclined to the radial direction may be provided, and the excitation section 41 may then be so formed that an orthogonally projected length x of the excitation section 41 in the radial direction is greater than an orthogonally projected length y of the excitation section 41 in the circumferential direction, as shown in FIG. 6. The thus formed excitation section 41 also provides the same advantageous effects as those provided by the first embodiment.

Third Embodiment

Figure 7:
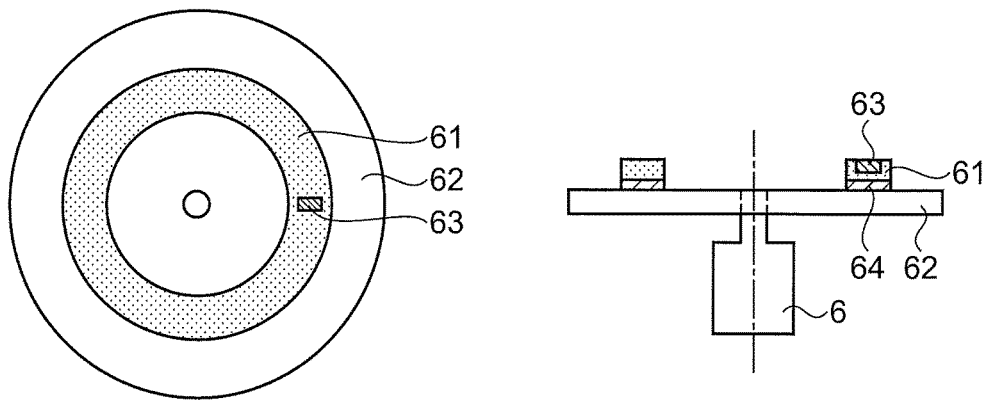
FIG. 7 is a plan view and a cross-sectional view of a rotating light emitting device in a third embodiment.

FIG. 7 is a plan view and a cross-sectional view of a rotating light emitting device provided in a light source apparatus according to a third embodiment. The rotating light emitting device in the present embodiment includes a YAG phosphor ceramic 61 as the wavelength conversion element, a rotating disk 62, and an adhesive 64, and an excitation section 63 is formed in the YAG phosphor ceramic 61. The YAG phosphor ceramic 61 is a YAG transparent crystal containing a trace amount of Ce ions. The thus formed YAG phosphor ceramic 61 is caused to adhere onto the rotating disk 62 with the adhesive 64. A highly reflective surface, such as an aluminum enhanced reflection film, is provided on the upper surface of the rotating disk 62 and reflects the yellow light produced in the YAG phosphor ceramic 61. To this end, the adhesive 64 is made of a transparent resin. In consideration of the thermal conductivity of the adhesive 64, the thickness thereof is desirably on the order of microns. Although the thermal conductivity of the YAG phosphor ceramic 61 is 14 W/mK, which is higher than the thermal conductivity of the silicone resin, heat generation still occurs due to Stokes loss and loss resulting from internal quantum efficiency, and the excitation section 63 is heated to a high temperature. As a result, the thermal conductivity of the phosphor decreases and the temperature further increases.

Consider a case where irradiation energy of the excitation light increases, for example, a case where irradiation energy of 100 W or higher is inputted to the rotating disk 62 having a diameter of 60 mm. Assuming that the excitation section 63 has an oblong shape the size of which is 2 mm in the radial direction and 0.5 mm in the circumferential direction, the YAG phosphor is heated to a temperature lower than 200° C., which falls within a range over which the reliability of the adhesive 64 can be ensured. If the shape of the excitation section 63 is 1 mm square, the temperature further increases by several tens of degrees and becomes higher than 200° C., which lowers long-term reliability of the adhesive and also lowers the light emission efficiency of the YAG phosphor ceramic 61. Further, since the period from the excitation of the Ce ions in the YAG via the light emission to the restoration of the ground state is long relative to the speed of rotation of the rotating disk 62 as described in the first embodiment, the light emission efficiency of the Ce ions excited during the period by the excitation light is insufficient, which causes heat generation and a decrease in the efficiency. The third embodiment, in which the excitation section 63 is elongated in the radial direction, provides an advantageous effect of efficient excitation of the Ce ions. That is, the light emission efficiency is effectively increased.

Fourth Embodiment

Figure 8:
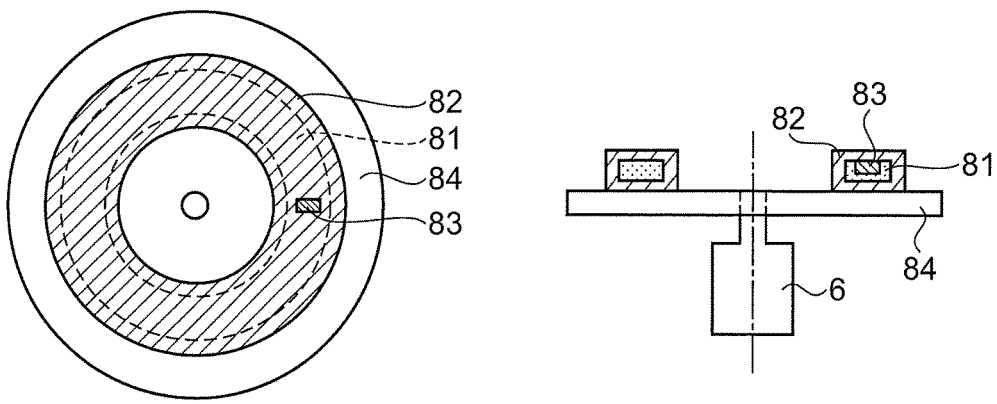
FIG. 8 is a plan view and a cross-sectional view of a rotating light emitting device in a fourth embodiment.

FIG. 8 is a plan view and a cross-sectional view of a rotating light emitting device provided in a light source apparatus according to a fourth embodiment. The rotating light emitting device in the present embodiment includes quantum dots 81 as the wavelength conversion element, a sealing glass portion 82, and a rotating disk 84, and an excitation section 83 is formed in the quantum dots 81. The quantum dots 81 absorb blue light having a wavelength of 450 nm and efficiently emit, depending on the size thereof, light having specific wavelengths corresponding to red and green. The energy loss in the light emission is caused by Stokes loss and a decrease in internal quantum efficiency, as in the case of a phosphor.

The quantum dots 81 are made, for example, of CdSe and sealed in the sealing glass portion 82 because the quantum dots 81 are sensitive, for example, to oxygen. To transfer heat generated in the quantum dots 81 to the rotating disk 84, it is important to set the thermal resistance of the sealing glass portion 82 at a low value, and the sealing glass portion 82 is preferably formed of a thin-film glass tube or made of a high-thermal-conductivity, transparent ceramic and formed in a hollow donut-like shape. To more simply configure the sealing glass portion 82, a resin containing the quantum dots 81 may be applied in a donut-like shape onto the rotating disk 84 made of aluminum, and an inorganic film that blocks air may then be layered onto the applied resin. The sealing glass portion 82 serves as an air blocking film, and needs to be resistant against heat equivalent to at least 100° C.

The excitation section 83 is set to be short in the circumferential direction but long in the radial direction so that degradation of the quantum dots 81 due to the blue light during a use period is reduced. That is, the degradation is reduced by reducing the total amount of energy inputted to a single quantum dot during the use period. The quantum dots 81 are also sensitive to heat. In the fourth embodiment, since the heat generation area can be increased, an increase in the temperature decreases, whereby the characteristics of the quantum dots 81 can be ensured. Since the light emission period of the quantum dots 81 is shorter than the light emission period of the YAG phosphor, the probability of the insufficient excitation caused by the blue light applied in the period from the ground state via the excitation and light emission to the restoration of the ground state decreases, and setting the excitation section 83 to be long in the radial direction can further prevent degradation in the excitation efficiency.

Each of the first, second, third, and fourth embodiments is an example of the invention. In a system in which an excitation section moves along a wavelength conversion element that absorbs excitation light and emits light, the advantageous effects of the invention are provided. The same advantageous effects are provided in many phosphors as well as a YAG phosphor. Further, in a case where the excitation section is inclined to the radial direction but the orthogonally projected length of the excitation section in the radial direction is greater than the orthogonally projected length of the excitation section in the circumferential direction, the rotating light emitting device has high light emission efficiency and a long lifetime from the same reasons in the first, second, third, and fourth embodiments.

Fifth Embodiment

Figure 9:
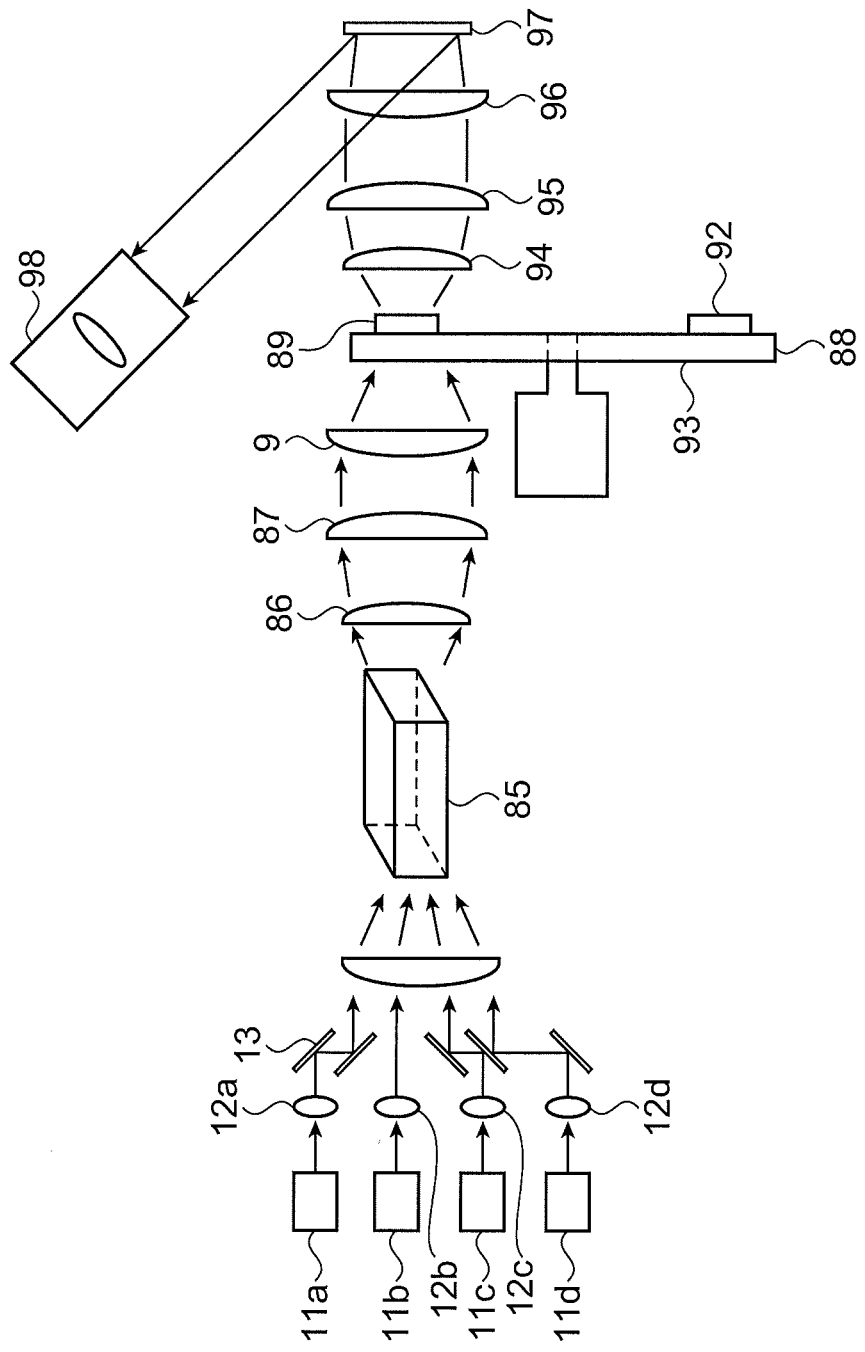
FIG. 9 shows an optical system of a projector in a fifth embodiment.

FIG. 9 shows an optical system of a projector according to a fifth embodiment. Parts common to those used in the projector described in the first embodiment have the same reference characters and will not be described. The projector according to the fifth embodiment includes a rod 85 and a DMD device 97, which is a light modulator. Although not shown, the DMD device 97 has a light modulation region where a plurality of micromirrors are provided.

The rod 85 has an opening the shape of which is similar to the shape of the light modulation region of the DMD device 97. In FIG. 9, the rod 85 is perspectively drawn. The light modulation region of the DMD device 97 has an oblong shape, for example, having an aspect of 16:9. Laser rays incident on the rod 85 undergo internal reflection in the rod 85 so that they have uniform intensity and form an oblong shape at the exit of the rod 85. A rotating light emitting device 93 is irradiated with the thus formed laser rays via field lenses 86 and 87.

Figure 10:
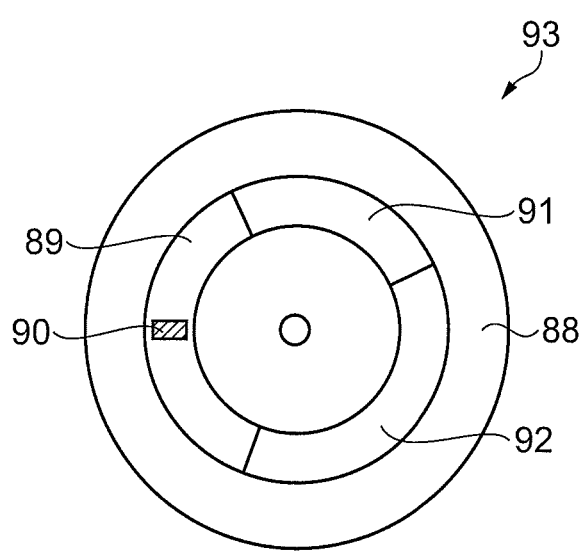
FIG. 10 is a plan view of a rotating light emitting device in the fifth embodiment.

FIG. 10 is a plan view of the rotating light emitting device 93 provided in a light source apparatus according to the fifth embodiment.

A rotating disk 88 is formed of a transparent, high-thermal-conductivity substrate, such as a sapphire substrate. On the rear surface of the rotating disk 88 (surface opposite the surface irradiated with light through field lens 87) are provided a red phosphor 89, a diffuser 91, and a green phosphor 92, which form a ring, along the direction of rotation, as shown in FIG. 10. An excitation section 90 is formed in a portion of any of the red phosphor 89, the diffuser 91, and the green phosphor 92 irradiated with the light having exited out of the field lens 87 and passed through the rotating disk 88. The excitation section 90 has an oblong shape similar to the shape of the exit of the rod 85.

The excitation section 90 emits blue light when formed in the diffuser 91, green light when formed in the green phosphor 92, and red light when formed in the red phosphor 89. The longitudinal direction of the oblong shape of the excitation section 90 is caused to coincide with the radial direction of the rotating disk 88, or the orthogonally projected length of the oblong shape in the radial direction of the rotating disk 88 is set to be greater than the orthogonally projected length of the oblong shape in the circumferential direction of the rotating disk 88. As a result, the area of a portion that is excited by the laser light so that heat is generated can be increased, whereby the temperatures of the red phosphor 89 and the green phosphor 92 can be lowered, as in the first to fourth embodiments. Further, the efficiency of the wavelength conversion resulting from the excitation of the phosphors can be maintained high.

The light from the excitation section 90 is guided through field lenses 94, 95, and 96 to the DMD device 97, and the light modulated by the DMD device 97 is projected through a projection lens 98 on a screen, as shown in FIG. 9. The present embodiment provides advantages of not only high efficiency and reliability of the phosphors but also a reduced amount of light loss because the rod 85, which is an optical integration system for the laser light, the excitation section 90, and the DMD device 97 have shapes similar to one another so that the overall optical system is formed of a small number of parts.

As an application of the invention, the embodiments have been described with reference primarily to a projector including liquid crystal panels, and the invention is also applicable to a DLP projector and a projector including an LCOS (liquid crystal on silicon) device. Further, the invention is effective as stage lighting, in which intense light is used as illumination, and vehicle illumination.

The entire disclosure of Japanese Patent Application No. 2014-200037, filed on Sep. 30, 2014 is expressly incorporated by reference herein.

What is claimed is:

1. A light source apparatus comprising:
a light source that outputs excitation light;
a rotating light emitting device in which a wavelength conversion element that emits light when irradiated with the excitation light is provided on a rotating disk, wherein a spot of the excitation light on the wavelength conversion element has a shape that is long in a radial direction of the rotating disk and short in a circumferential direction of the rotating disk, or an orthogonally projected length of the spot in the radial direction is greater than an orthogonally projected length of the spot in the circumferential direction; and
an optical integration system which includes a pair of lens arrays and on which light having exited out of the spot is incident,
wherein an image of the spot is formed on a lens cell of a downstream lens array of the pair of lens arrays, and
wherein a longitudinal direction of the image of the spot coincides with a longitudinal direction of the lens cell, coincides with a diagonal direction of the lens cell, or coincides with an intermediate direction between the longitudinal direction and the diagonal direction.

2. The light source apparatus according to claim 1, wherein the spot has an oblong shape, an elliptical shape, or a shape that approximates an oblong shape or an elliptical shape.

3. The light source apparatus according to claim 1, wherein the wavelength conversion element contains a phosphor.

4. The light source apparatus according to claim 1, wherein the wavelength conversion element contains quantum dots.

5. A projector comprising:
the light source apparatus according to claim 1; and
a light modulator that modulates light outputted from the light source apparatus.

6. The projector according to claim 5, wherein the spot has a shape similar to a shape of a light modulation region of the light modulator.

7. A light source apparatus comprising:
a light source that outputs excitation light;
a rotating light emitting device in which a wavelength conversion element that emits light when irradiated with the excitation light is provided on a rotating disk, wherein a spot of the excitation light on the wavelength conversion element has a shape that is long in a radial direction of the rotating disk and short in a circumferential direction of the rotating disk, or an orthogonally projected length of the spot in the radial direction is greater than an orthogonally projected length of the spot in the circumferential direction; and
an optical integration system which includes a rod and on which light having exited out of the spot is incident,
wherein an image of the spot is formed on a light incident end surface of the rod, and
wherein a longitudinal direction of the image of the spot coincides with a longitudinal direction of the light incident end surface, coincides with a diagonal direction of the light incident end surface, or coincides with an intermediate direction between the longitudinal direction and the diagonal direction.

8. The light source apparatus according to claim 7, wherein the spot has an oblong shape, an elliptical shape, or a shape that approximates an oblong shape or an elliptical shape.

9. The light source apparatus according to claim 7, wherein the wavelength conversion element contains a phosphor.

10. The light source apparatus according to claim 7, wherein the wavelength conversion element contains quantum dots.

11. A projector comprising:
the light source apparatus according to claim 7; and
a light modulator that modulates light outputted from the light source apparatus.

12. The projector according to claim 11, wherein the spot has a shape similar to a shape of a light modulation region of the light modulator.

* * * * *